Feb. 3, 1931.   J. B. DAVIS   1,791,195
LIQUID DISPENSING APPARATUS
Filed Sept. 16, 1929   3 Sheets-Sheet 1
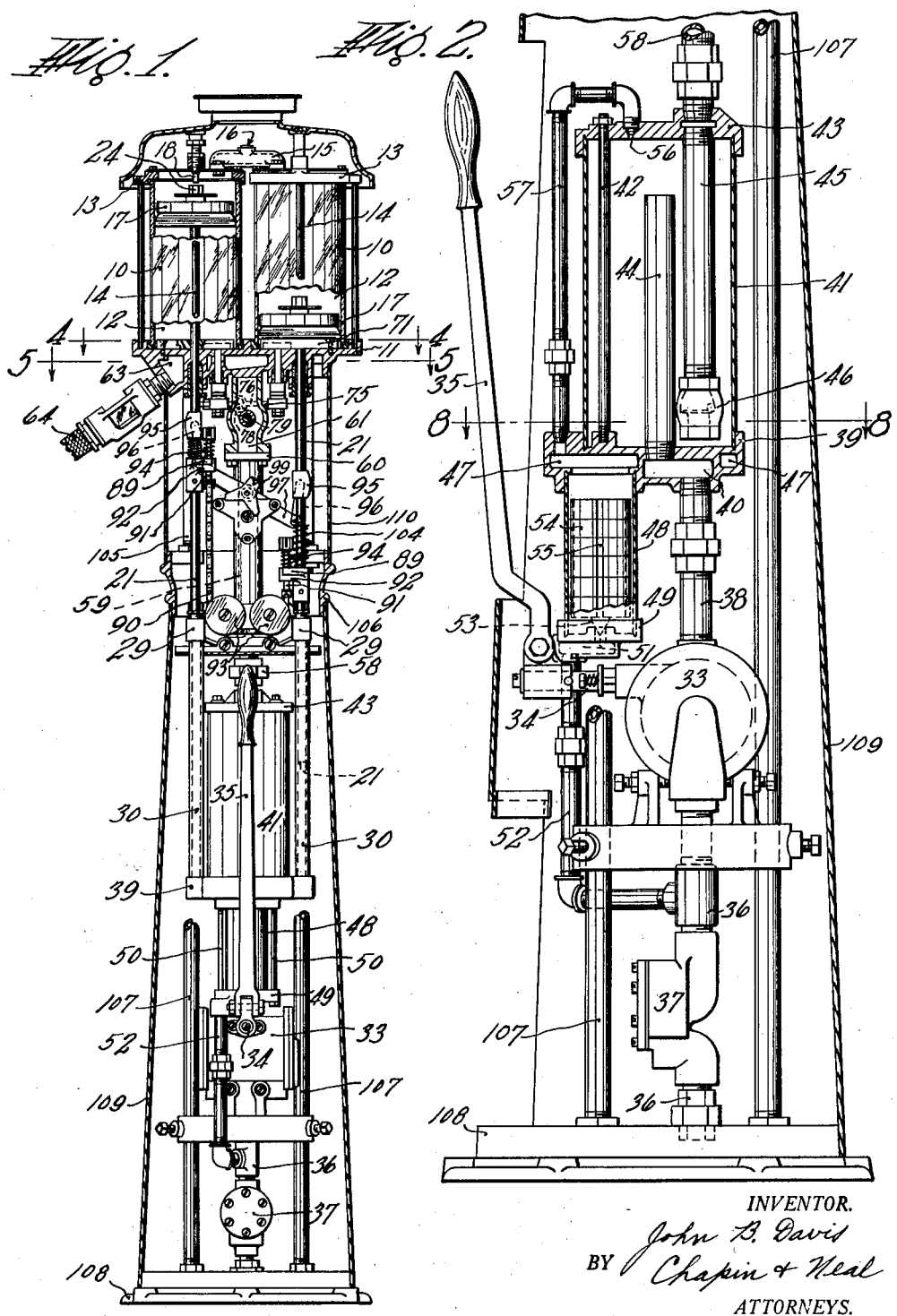
INVENTOR.
John B. Davis
BY Chapin & Neal
ATTORNEYS.

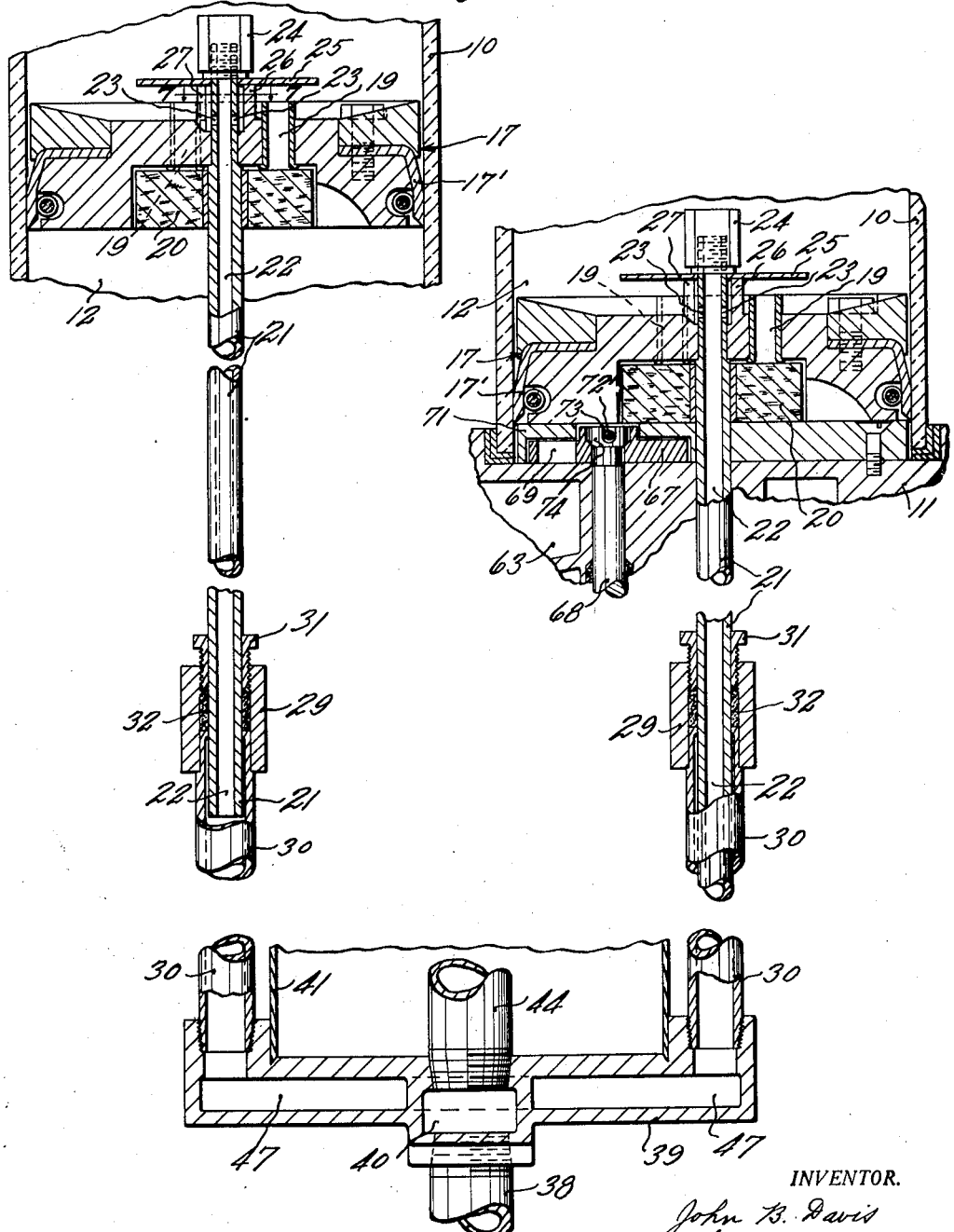

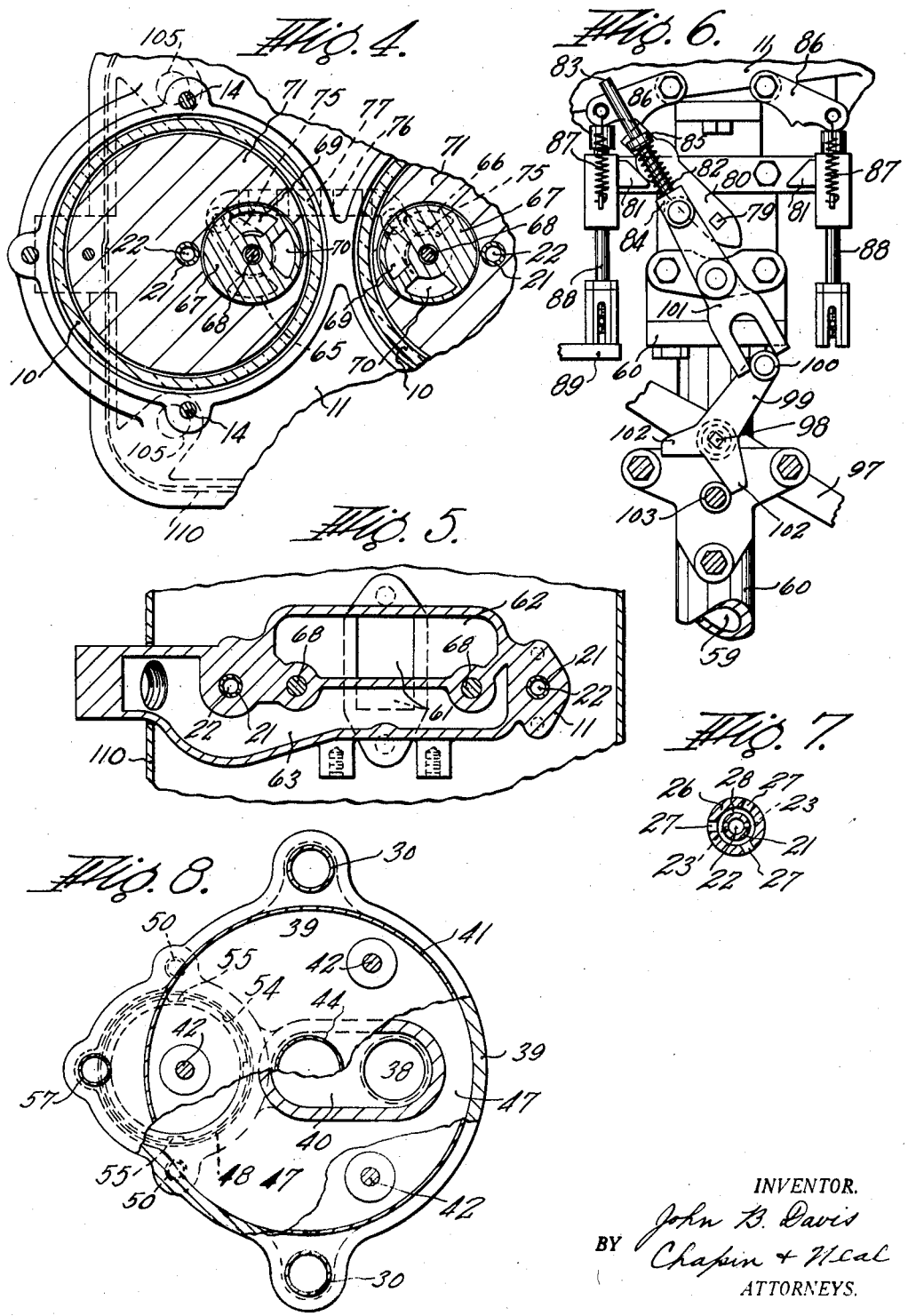

Patented Feb. 3, 1931

1,791,195

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed September 16, 1929. Serial No. 392,970.

This invention relates to improvements in liquid dispensing apparatus such, for example, as is suitable for dispensing gasoline and the like in measured quantities.

More particularly, the invention has to do with that type of apparatus having a measuring chamber with a piston therein, together with intermittently operable means for forcing liquid into one end of the chamber to move the piston in one direction. The piston, when so moved, eventually abuts a stop which arrests the piston after the desired predetermined measured volume of liquid has entered the chamber. The piston is then moved in the opposite direction in any suitable way to expel the measured quantity. Preferably, two such measuring chambers are used and arranged so that one fills while the other discharges. In such case, the pistons of the two measuring chambers are interconnected so that the movement of either piston by liquid entering its chamber will effect the expelling stroke of the other piston and discharge the liquid previously measured in the other chamber.

An apparatus of the type described is disclosed in the copending application of Alfred L. Grise, filed June 18, 1929, under Serial No. 371,854.

One object of this invention is to provide in such an apparatus a means for draining from each measuring chamber any liquid which may occasionally pass by the piston, either around the cup leather of the piston or through the float actuated air vent valve therein. In carrying out this object, the piston in each measuring chamber is provided with a hollow piston rod which serves as a drain pipe and this rod telescopes into a stationary drain pipe, connected through the intermediary of a trap with the suction pipe of the pump, used to force liquid into the measuring chambers.

Another object of the invention is to provide a separator for removing air from the liquid during its passage from the pump to the measuring chamber, characterized in that the air outlet of the separator is connected to the aforesaid pipe and hollow piston rods. In this way, air escaping from the separator may pass upwardly through the hollow piston rods into the upper ends of the measuring chambers, which ends are vented to the atmosphere. At the same time, such liquid as may occasionally pass by the piston may be drained by the hollow piston rods into the trap. Also, any liquid passing with the air from the separator will be received in the trap and returned to the suction line of the pump.

Another object of the invention is to provide, in connection with the apparatus just described, a constantly open air escape port, for the air separator, which port is of restricted area in comparison with the inlet and outlet ports for liquid and connected, as above stated, to the aforesaid drain pipe and trap. In this way, the customary relief valve controlled by-pass from the discharge side to the suction side of the pump can be dispensed with because any excess pressure will be relieved through the air escape port into the trap and thence to the suction line.

Other objects will appear as the description proceeds and will be pointed out in the appended claims.

The invention will be disclosed with reference to the accompanying drawings, in which—

Fig. 1 is an elevational view, with parts in section, of a dispensing apparatus embodying the invention;

Fig. 2 is a view taken at right angles to Fig. 1 and showing the lower portion of the apparatus;

Fig. 3 is a fragmentary sectional elevational view, illustrative of the hollow piston rods and their connections with the base of the air separator;

Figs. 4 and 5 are sectional plan views taken on the lines 4—4 and 5—5, respectively, of Fig. 1;

Fig. 6 is a front elevational view of the valve actuating mechanism;

Fig. 7 is a sectional plan view taken on the line 7—7 of Fig. 3; and

Fig. 8 is a sectional plan view, taken on the line 8—8 of Fig. 2, showing the air separator and associated parts.

I have chosen to illustrate my invention in connection with a so-called twin cylinder gasoline dispenser, in which two glass cylinders 10 are mounted side by side on a common lower head 11 and afford measuring chambers 12. Each cylinder 10 is suitably clamped between the head 11 and an upper head 13 as by tie rods, shown in part at 14. A pipe 15 connects the upper ends of the two measuring chambers 12 and has an opening at 16 to the atmosphere. Within each cylinder 10 is a piston 17, mounted to move between fixed limits, such as the head 11 and an adjustable stop 18 mounted in head 13.

The piston construction is best shown in Fig. 3. It includes a suitable piston leather 17' and has a passage 19 formed therein for enabling the escape of air from the lower to the upper vented part of its measuring chamber. This passage is controlled by a float valve 20, which is vertically slidable upon the piston rod 21. Each piston rod is hollow, having a passage 22 extending longitudinally from end to end thereof and, near its upper end, lateral openings 23 which connect the passage 22 to the outer periphery of the rod. Each piston rod is clamped to its piston by a nut 24, which presses an intervening baffle plate 25 against a hub 26 on the upper face of the piston. Each hub 26 is slotted, as at 27 (Fig. 7). The nut 24 closes the upper end of the passage 22 in its piston rod but constant communication between the passage 22 and the upper and vented part of the measuring chamber is afforded by way of the openings 23, annular space 28 and slots 27. Each piston rod is slidable through the lower head 11 and the latter is provided with a suitable stuffing box, as indicated. Below the head are fixed piston rod guides 29 and into the lower end of each is fixed a pipe 30. The upper end of each pipe 30 forms the base of a stuffing box, the gland 31 of which is threaded into the guide 29 and presses the packing 32 about the piston rod 21. Each piston rod is freely slidable in its pipe 30 and its passage 22 is in constant communication therewith. As will be clear from Fig. 1, the pipes 30 are sufficiently long to permit the necessary travel of the piston rods.

Liquid may be supplied to the measuring cylinders in any suitable way. As herein shown, a pump 33 is provided which has an oscillating drive shaft 34 operable by the lever 35 (Fig. 2). The suction pipe of this pump is shown at 36 and has interposed therein a filter 37. Pipe 36 is adapted for connection to a low level liquid supply tank (not shown). The discharge pipe 38 of pump 33 is threaded into the lower head 39 of an air separator and communicates with a chamber 40 formed in such head. This separator consists of a tank formed by a cylindrical shell 41, suitably clamped, as by the tie rods 42, between upper and lower heads 43 and 39 respectively. Secured to head 39 and communicating with chamber 40 is an upstanding pipe 44, which terminates near the upper part of the separator tank with an open upper end. Secured to the upper head is a liquid discharge pipe 45 which extends downwardly, terminating near the bottom of the separator with an open lower end. A check valve 46 is provided in pipe 45 to permit outflow of liquid from the separator and prevent inflow.

The lower head 39 of the separator is provided with a chamber 47 (Figs. 2 and 3) and, the pipes 30, heretofore described, are threaded into this head and communicate with this chamber. Secured to and depending from head 39 is a cylindrical shell 48, clamped between a lower head 49 and head 39 by the tie bolts 50, shown in Fig. 1. This shell forms a liquid trap and its open upper end communicates with chamber 47. An outlet passage 51 for the trap is formed in head 49 and this passage is connected by a pipe 52 to the suction pipe 36 at a point below pump 33. Passage 51 is normally closed by a valve 53 to which is secured a float 54. This float is of a size sufficient to lift valve 53 against the suction of the pump. It nearly fills the trap and closely fits the shell 48, wherefore grooves 55 are provided in the float to allow room for liquid to freely pass through the shell to the outlet end thereof. In the upper head 43 of the separator an air escape port 56 is provided which is connected by a pipe 57 to the chamber 47. The port 56 is constantly open but, being of much less area than either the inlet or discharge pipes 44 and 45, respectively, does not lessen the pressure in discharge pipe 45 to an extent sufficient to impair the action of the apparatus.

The discharge pipe 45 of the separator is connected by a pipe 58 to a passage 59 in a casting 60, which is secured to and depends from the head 11. The piston rod guides 29 are integral with casting 60. The passage 59 communicates with a vertical passage 61 in head 11 and the passage 61 communicates as shown in Fig. 5 with a horizontal passage 62 in the head. The passage 62 underlies a part of each measuring chamber 12. In front of the supply passage 62 is a discharge passage 63, the outlet of which is adapted for connection to a delivery hose 64 (Fig. 1). Discharge ports 65 (Fig. 4) and inlet ports 66 are provided in the upper wall of casting 11, one for each measuring chamber, and communicate with passages 63 and 62, respectively. Resting on the upper face of casting 11 are disc valves 67, one for each cylinder, the stems 68 of which pass downwardly through the casting for connection to actuating means to be described. Each valve 67 has two ports 69 and 70, arranged at right angles, so that when one, such as 69, overlies in the inlet port 66, the other will overlie a blank part of the casting 11, as shown in the left-hand part of Fig. 4, while when the other port 70 overlies the discharge port 65, the port 69 will overlie a blank part of the casting, as shown in the right-hand part of Fig. 4. The two valves are interconnected so that when one connects its measuring chamber to inlet port 66 the other will connect its chamber to outlet port 65 and vice versa. Circular plates 71, one for each measuring chamber and each recessed in its lower face to receive valve 67, are secured to the upper face of casting 11. These plates afford flat upper surfaces with which the flat lower surfaces of pistons 17 abut to expel all the liquid from the measuring cylinders. These plates 70, it will be understood, are provided with ports overlying the ports 65 and 66.

Any suitable means may be used for actuating the valves 67. One suitable means is disclosed in the above identified copending application, and has been illustrated herein sufficiently to enable, with the following brief description, an understanding of the general operation,—reference being had to said application for a complete disclosure.

Each valve stem 68 (Fig. 3) is held to turn with the valve by a pin 72 which passes diametrically through the hub of the valve 67 and through a slot 73 in a head 74 on stem 68. This head, which is seated in a recess in the valve hub, has a rounded lower end which can rock in the recess and the stem loosely fits the valve to allow limited rocking movement, wherefore the valve can seat on the machined upper face of casting 11, even though its lower face is not exactly at right angles to the axis of its stem 68. The stems 68 carry levers 75, which are interconnected by a link 76 (Fig. 4). This link has a central recess 77 to receive the free end of a lever 78 (shown in Fig. 1), which is fixed to a shaft 79 mounted in casting 11 and passing through passage 61. Shaft 79 carries a lever 80 (Fig. 6) which is movable between fixed stops 81 under the action of a drive spring 82. The drive spring is coiled around a rod 83 and acts between a head 84, fixed on the rod, and a head 85 which is swiveled in the upper end of lever 80. The latter is held against movement by either of a pair of pivoted latches 86 which are urged downwardly by springs 87 and the free ends of which rest on the enlarged upper ends of vertically slidable rods 88. By lifting the rods 88, the latches can be withdrawn from holding engagement with lever 80. An abutment 89 (Fig. 1) is provided on each piston rod 21 to engage and lift the overlying rod 88 and cause the release of valve lever 80 at the exact moment that the connected piston 17 has reached the upper end of its stroke as defined by the abutment of the nut 24 on the piston with the stop 18.

The piston rods 21 are interconnected by a chain 90, the ends of which are connected to rods 91, slidably mounted in abutments 92, fixed one to each piston rod and integral with abutments 89. The chain is guided over pulleys 93 mounted on the casting 59. A spring 94 encircles each rod 91 and acts between abutment 92 and a head on the upper end of the rod to draw the rod upwardly. In the operation of the apparatus, one piston reaches the end of its downstroke and abuts member 11 before the other piston reaches the end of its upstroke and the springs 94 yield to permit the upwardly moving piston to continue its travel and reach the stop 18.

Slidable on each piston rod is a collar 95 to which is pivotally attached the upper end of a link 96. The lower ends of these links are pivotally connected to a lever 97, one to each end thereof. This lever (Fig. 6) is centrally fixed to a shaft 98 mounted in a bearing on casting 60. The shaft 98 carries a lever 99 having a roll 100 which rides in the slotted lower end of a lever 101. This lever is pivotally supported from casting 11 and its upper end is pivotally secured to the rod 83, which carries the drive spring 82. Lever 99 has two stops 102 which cooperate with a fixed stop 103 on casting 60 to limit its movement. The collars 95 are lifted through the intermediary of springs 104, coiled about the piston rods and resting on abutments 92.

The casting 11 is supported by rods 105 from a ring 106, which in turn is supported by similar rods 107, partly broken away in Fig. 1, from a base piece 108. A casing 109 encloses the space between members 108 and 106 and a casing 110 encloses the space between members 106 and 11. The pump 33 is supported by rods 107, as indicated in Figs. 1 and 2.

The operation of the apparatus will now be described. In the drawings, the left-hand piston 17 is shown almost at the very end of its upstroke and the piston abutment 89 (Fig. 6) is about to release the left-hand latch 86. Operation of pump 33 will force liquid through the registering ports 66 and 69 into the left-hand measuring chamber and move the piston 17 until it abuts stop 18. At this instant, the left-hand latch 86 will release lever 80 and the latter will be moved by the expansion of spring 82 until the lever abuts the left-hand stop 81. This movement of lever 80 will, through lever 78, move both valves 67 in a clockwise direction as viewed in Fig. 4, through an angle of ninety degrees. Thus, the right-hand chamber 12 will be connected to inlet passage 62 while the left-hand chamber will be connected to discharge passage 63. Pumping being continued, the right-hand piston 17 will be lifted and will, through chain 90 and associated parts, pull the left-hand piston downwardly to expel the contents of the left-hand measuring chamber. As the right-hand piston rod 21 moves upwardly, it will, through spring 104 move the overlying collar 95 and rock lever 97 in a counterclockwise direction. Lever 99 will be rocked in the same direction and will cause a movement of lever 101 in a clockwise direction. Lever 101, when so moved, will compress drive spring 82 between collars 84 and 85. The rod 83, at the start of this action, will lie nearly at right angles to lever 101 and as the action proceeds the lever and rod swing into line, in a manner similar to what is shown in the left-hand part of Fig. 6, and the spring 82 will be positioned so as to be capable of moving lever 80 to the left when the right-hand latch 86 is released at the end of the upstroke of the right-hand piston 17. On release of the right-hand latch 86, lever 80 will be driven back into the illustrated position, thus again reversing valves 67. On the upstroke of the left-hand piston, lever 67 will be rocked in a clockwise direction to move lever 101 in a counterclockwise direction which will again compress the drive spring and move it back into the position shown in Fig. 6.

In pumping liquid to the measuring chambers, the liquid is forced to travel through the air separator tank before it reaches the chambers and is there freed of air in a known manner. Liquid enters the separator tank near the top, liberating the air at a location near the air escape port 56. Such liquid as is free from air bubbles is of greater density than the rest and settles to the bottom of the tank where it is forced out through the outlet 45. Air from the separator, and sometimes also a little liquid with it, flows out through pipe 57 into chamber 47. The liquid will flow into trap 48 while the air will find a free vent through pipes 30 and hollow piston rods 21 into the upper and vented parts of measuring chambers 12. Ordinarily, these piston rods act as vent pipes, carrying the air to the upper part of the apparatus, where it is free to escape. Occasionally, however, some liquid may pass through the air vents 19 in the pistons 17. As the float 20 closes these vents, a jet or jets of liquid will sometimes shoot therethrough. These jets are arrested by baffle 25 and the liquid falls into the saucer-like top of the piston and drains into the hollow piston rods 21. It is also possible that some liquid may occasionally pass by the piston leathers 17' and such liquid also is drained into the hollow piston rods and thence to the trap 48. The outlet of the latter is normally closed but when sufficient liquid collects in the trap, the float 54 will rise and open the outlet, allowing the liquid to be drawn into the suction pipe of the pump.

In the event of any condition developing in the apparatus, whereby undue pressure might develop, it is usual to provide a relief-valve controlled by-pass around pump 33. In this case, the ordinary by-pass is omitted and the purpose accomplished by the establishment, when necessary, of a restricted by-pass consisting of the air escape port 56, pipe 57, trap 48, and pipe 52. Even if the flow through outlet pipe 58 were blocked, liquid could still escape through port 56 and pipe 57 into trap 48, and the float 54 therein would lift to open the outlet and establish the by-pass.

The invention has been disclosed herein, in an embodiment at present preferred, for illustrative purposes, but the scope of the invention is defined by the appended claims rather than by the foregoing description.

Claims:

1. Liquid dispensing apparatus, comprising, a measuring chamber, a piston therein, pumping means for forcing liquid into one end of said chamber to move the piston therein in one direction, a suction pipe for said pumping means adapted to connect the latter to a source of liquid supply, means for moving the piston in the opposite direction to discharge liquid from said measuring chamber, a hollow piston rod connected to said piston and having its interior arranged to communicate with the other end of said chamber and receive and drain any liquid which may pass the piston, a stationary drain pipe connected telescopically with said hollow piston rod, a trap having its inlet connected to said drain pipe and its outlet to said suction pipe, and a valve controlling said outlet and operable to open the latter when the liquid in said trap reaches a predetermined level.

2. Liquid dispensing apparatus, comprising, a pair of measuring chambers, a piston in each chamber, liquid pumping means, a suction pipe for connecting the pumping means with a source of supply, means for alternately connecting said chambers at one end to the pumping means and for enabling liquid to discharge from either cylinder while the other is being filled, a hollow piston rod connected to each piston and having its interior arranged to communicate with the other end of its measuring chamber and receive and drain any liquid passing its piston, means connecting said piston rods whereby the movement of either piston in one direction under the force of liquid entering one cylinder will cause the other piston to move in the opposite direction and discharge the liquid from its cylinder, stationary drain pipes one for each piston rod and telescopically engaged therewith, a trap having its inlet connected to both drain pipes and its outlet to said suction pipe, and a valve controlling the outlet of said trap and operable to open such outlet when the liquid in said trap reaches a predetermined level.

3. Liquid dispensing apparatus, comprising, a measuring chamber, a piston therein, a supply conduit and means for forcing liquid through it into one end of said chamber to move said piston in one direction, said chamber at its other end having a vent opening to the atmosphere, means for moving the piston in the opposite direction to discharge liquid from said measuring chamber, an air separator tank interposed in said conduit and having an air escape port, a piston rod for said piston having a longitudinal passage therein communicating at one end with the other end of said chamber, and a stationary pipe with which the other end of said piston rod is telescopically engaged, said stationary pipe being connected to said air escape port and communicating at all times with the passage in the piston rod, whereby air escaping from the separator may pass through said pipe and hollow piston rod to the aforesaid vent.

4. Liquid dispensing apparatus, comprising, a measuring chamber, a piston therein, a supply conduit and means for forcing liquid through it into one end of said chamber to move said piston in one direction, said chamber at its other end having a vent opening to the atmosphere, means for moving the piston in the opposite direction to discharge liquid from said measuring chamber, an air separator tank interposed in said conduit and having an air escape port, a piston rod for said piston having a longitudinal passage therein communicating at one end with the other end of said chamber, a stationary pipe with which the other end of said piston rod is telescopically engaged, said stationary pipe being connected to said air escape port and communicating at all times with the passage in the piston rod, whereby air escaping from the separator may pass through said pipe and hollow piston rod to the aforesaid vent, and a trap connected with said pipe to collect any liquid which may pass with the air through said port, said trap having a normally closed outlet for liquid and a valve automatically operable when a predetermined amount of liquid accumulates in the trap to open said valve.

5. Liquid dispensing apparatus, comprising, a measuring chamber, a piston therein, a supply conduit and means for forcing liquid through it into one end of said chamber to move said piston in one direction, said chamber at its other end having a vent opening to the atmosphere, means for moving the piston in the opposite direction to discharge liquid from said measuring chamber, an air separator tank interposed in said conduit and having an air escape port, a piston rod for said piston having a longitudinal passage therein communicating at one end with the other end of said chamber, a stationary pipe with which the other end of said piston rod is telescopically engaged, said stationary pipe being connected to said air escape port and communicating at all times with the passage in the piston rod, whereby air escaping from the separator may pass through said pipe and hollow piston rod to the aforesaid vent, a trap connected with said pipe to collect any liquid which may pass with the air through said port, said trap having a normally closed outlet for liquid and a valve automatically operable when a predetermined amount of liquid accumulates in the trap to open said valve, and a connection from the outlet of said trap to said supply conduit at a point below said liquid forcing means.

6. Liquid dispensing apparatus, comprising, a pump, a suction pipe for connecting the latter to a source of liquid supply, a discharge pipe for said pump, an air separator chamber with which said discharge pipe communicates at a point between the upper and lower ends thereof, a liquid outlet pipe communicating with the separator chamber at a lower point and near the lower end thereof, said separator chamber being otherwise closed except for a constantly open air escape port near the upper end thereof, said port being of small area as compared with the inlet and outlet passages for liquid, a measuring chamber, a piston therein, a discharge pipe for said measuring chamber, valve means for alternately connecting one end of the measuring chamber to said liquid outlet pipe and said last named discharge pipe, an air vent for the other end of the measuring chamber, a hollow piston rod for said piston communicating at one end with the other end of the measuring chamber at all times, a stationary pipe with which the other end of the hollow piston rod is telescopically engaged and with which said air escape port is connected, a trap in said stationary pipe having its liquid outlet connected to said suction pipe, and a normally closed valve for said trap outlet operable when a predetermined amount of liquid accumulates in the trap to open said outlet.

7. Liquid dispensing apparatus, comprising, a pair of measuring chambers, a piston in each chamber, a supply conduit and means for forcing liquid through it alternately into said chambers near one end thereof, hollow piston rods connected one to each piston and each communicating with its measuring chamber near the other end thereof, a vent for the last named end of each measuring chamber, means interconnecting said piston rods whereby the movement of either by liquid forced into its chamber will move the other to discharge liquid from its chamber, an air separator interposed in the supply conduit and having an air escape port, and stationary pipes one for each piston rod and telescopically engaged therewith, said stationary pipes communicating with said air escape port, whereby air escaping from the separator may pass through said stationary pipes and hollow piston rods to the vented ends of said measuring chambers.

8. Liquid dispensing apparatus, comprising, a pair of measuring chambers, a piston in each chamber, a supply conduit and means for forcing liquid through it alternately into said chambers near one end thereof, hollow piston rods connected one to each piston and each communicating with its chamber near the other end thereof, a vent for the last named end of each measuring chamber, means interconnecting said piston rods whereby the movement of either by liquid forced into its chamber will move the other to discharge liquid from its chamber, an air separator interposed in the supply conduit and having an air escape port, stationary pipes one for each piston rod and telescopically engaged therewith, said stationary pipes communicating with said air escape port, whereby air escaping from the separator may pass through said stationary pipes and hollow piston rods to the vented ends of said measuring chambers, and a trap having its inlet connected to both said stationary pipes to collect any liquid which may pass with the air from the separator or which may pass said pistons and drain through to the hollow piston rods, said trap having a normally closed outlet for liquid and a valve automatically operable when a predetermined amount of liquid accumulates in the trap to open said valve.

9. Liquid dispensing apparatus, comprising, a pair of measuring chambers, a piston in each chamber, a supply conduit and means for forcing liquid through it alternately into said chambers near one end thereof, hollow piston rods connected one to each piston and communicating with its chamber near the other end thereof, a vent for the last named end of each measuring chamber, means interconnecting said piston rods whereby the movement of either by liquid forced into its chamber will move the other to discharge liquid from its chamber, an air separator interposed in the supply conduit and having an air escape port, stationary pipes one for each piston rod and telescopically engaged therewith, said stationary pipes communicating with said air escape port, whereby air escaping from the separator may pass through said stationary pipes and hollow piston rods to the vented ends of said measuring chambers, a trap having its inlet connected to both said stationary pipes to collect any liquid which may pass with the air from the separator or which may pass said pistons and drain through the hollow piston rods, said trap having a normally closed outlet for liquid and a valve automatically operable when a predetermined amount of liquid accumulates in the trap to open said valve, and a connection between the trap outlet and said supply conduit at a point below said separator and liquid forcing means.

10. Liquid dispensing apparatus, comprising, a pump, a suction pipe for connecting the latter to a source of liquid supply, a discharge pipe for said pump, an air separator chamber with which said discharge pipe communicates at a point between the upper and lower ends thereof, a liquid outlet pipe communicating with the separator chamber at a lower point and near the lower end thereof, said separator chamber being otherwise closed except for a constantly open air escape port near the upper end thereof, said port being of small area as compared with the inlet and outlet passages for liquid, a pair of measuring chambers, a piston in each chamber, a delivery conduit, valve means for alternately connecting the measuring chambers at one end to said discharge conduit and supply conduit, whereby one chamber may fill while the other discharges, an air vent for each measuring chamber near the other end thereof, a hollow piston rod for each piston having the opening therein in constant communication with the vented end of its measuring chamber, stationary pipes one for each piston rod and telescopically engaged therewith, said stationary pipes being connected together and to said air escape port, a trap having its inlet connected to the connected stationary pipes and its outlet to said suction pipe, and a valve normally closing the trap outlet and operable to open the same when a predetermined amount of liquid accumulates in the trap.

11. In liquid dispensing apparatus, an air separator, comprising, a tank having upper and lower heads, the lower head having two chambers formed therein, said lower head having a liquid inlet port opening into one of said chambers, an upstanding liquid inlet pipe within the tank secured to the lower head thereof and in communication with the last named chamber, a liquid outlet pipe communicating with the tank near the lower end thereof, said upper head having an air escape port, a conduit connecting the air escape port to the other of said chambers, a vent pipe extending upwardly from the last named chamber, a liquid trap secured to the lower head with its inlet in open communication with the last named chamber, said trap having a liquid outlet, and a float actuated valve in said trap normally closing the trap outlet but operable to open the same when a predetermined amount of liquid accumulates in the trap.

In testimony whereof I have affixed my signature.

JOHN B. DAVIS.